March 19, 1940.  K. W. MESTERTON  2,193,830

VEGETABLE SLICING AND STRINGING TOOL

Filed Sept. 20, 1937

INVENTOR
*Kuno W. Mesterton.*
BY
*Van Deventer & Grier*
ATTORNEYS

Patented Mar. 19, 1940

2,193,830

UNITED STATES PATENT OFFICE 2,193,830

VEGETABLE SLICING AND STRINGING TOOL

Kuno W. Mesterton, Brooklyn, N. Y.

Application September 20, 1937, Serial No. 164,610

1 Claim. (Cl. 146—98)

This invention relates to improvements in a vegetable slicing and stringing tool for use with any vegetable, but more particularly adapted to slice and string beans, and has for its object the provision of a tool of simple construction having few parts and having the advantages hereinafter set forth.

By way of illustration, one embodiment of the invention is disclosed in the following specification, and in the accompanying drawing.

Figure 1:
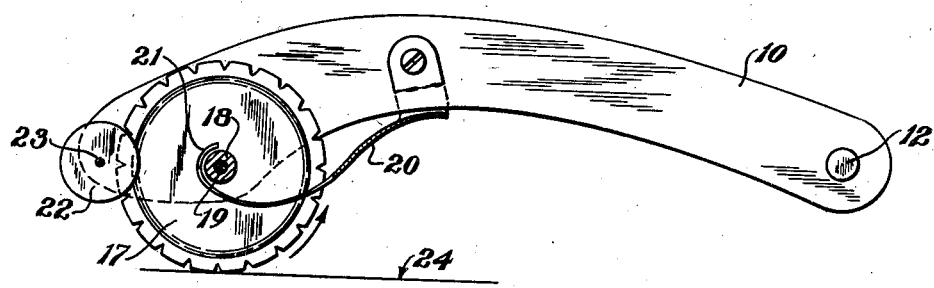
Figure 1 is a sectional view of the tool embodying the invention 1—1, Fig. 2.
Figure 2:
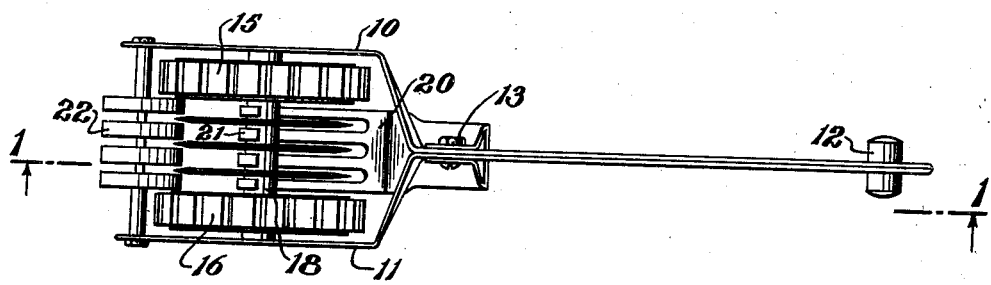
Figure 2 is a top view of the tool, Figure 1.
Figure 3:
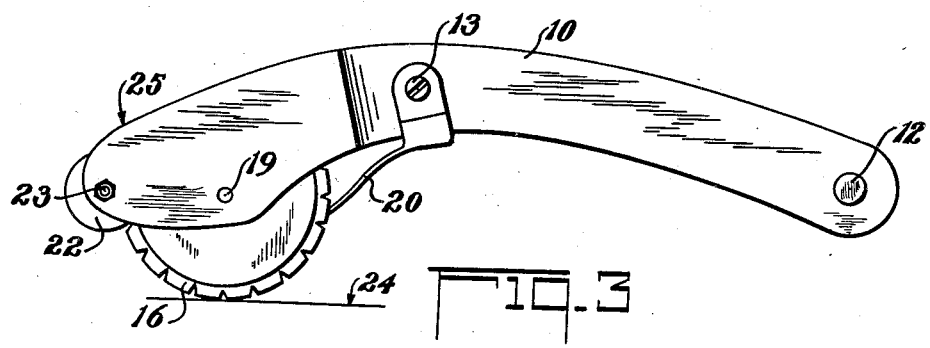
Figure 3 is a side view of the tool, Figure 1.

The tool has a forked-shape frame which may be formed of the side members 10 and 11, shaped as shown in the figures and held together by any suitable means such as the rivet 12 and bolt 13 or they may be spot welded together. Between the ends of the fork is supported a cutter member including the side members or rollers 15 and 16 which may be made of any suitable material, preferably a tough rubber similar to the tread of an automobile tire. These side members are corrugated so that they will firmly grip the surface over which they are rolled.

The center portion of the cutter is comprised of a plurality of circular knives 17, spaced apart as shown by spacers 18 and mounted on shaft 19 supported in the side members. The shaft, spacers, knives, and side rollers form an assembly which turns in the side members or frame.

A fork 20 is secured to the frame by bolt 13 and the tines of same are shaped as shown at 21 to curve upwardly around the spacers 18 to prevent the vegetable from wrapping around the cutter.

Immediately ahead of the cutter and secured to the open end of the forked frame in any suitable manner is a feed roller or rollers 22 supported on shaft 23.

In use, the device is pushed along any suitable surface 24 which action rotates the cutter. A bean thrust into the device in the direction of the arrow 25 will engage the cutters 17 and will enter between them and the feed rollers 22. As the cutter revolves, the bean will be drawn downwardly until in contact with the surface 24 (the device being moved from right to left, Fig. 1) and during this operation the rollers 15 and 16 of the cutter will grip the surface 24 and revolve the cutter so that the bean will be drawn through the knives 17. The knives are so arranged as to string the bean if desired, and to slit the same longitudinally into a number of pieces.

It will be observed from a study of the foregoing disclosure that the device is simple in construction, positive in operation, that it is easily cleaned, and that all parts are open for inspection at all times.

What is claimed is:

In a tool of the character described, an open-ended frame, a shaft rotatably supported therein, a plurality of circular knives fixed on said shaft in spaced relation to each other, a fixed shaft also supported in said frame, a plurality of rollers of substantially rectangular cross section, smaller in diameter than the diameter of said knives, and of a thickness less than the space between any two adjacent knives, said rollers being freely supported on said fixed shaft with one roller positioned between each two adjacent knives, the distance between said shafts being such that the knives extend between said rollers a substantial distance below the outer diameters thereof, driving means secured to said first shaft and comprising at least one resilient roller substantially greater in diameter than said knives so as to extend outside of said frame, and handle means on said frame for manually moving said tool over a surface with said resilient roller in contact therewith for driving said knives and thereby cutting vegetables passing between said feed rollers and said knives, said rollers being positioned in said frame in such relation that normal use of said tool keeps the rollers out of contact with said surface.

KUNO W. MESTERTON.